United States Patent
Luo et al.

(10) Patent No.: US 12,483,099 B2
(45) Date of Patent: Nov. 25, 2025

(54) ELECTRIC MACHINE WITH RECONFIGURABLE ROTOR POLES

(71) Applicant: GM GLOBAL TECHNOLOGY OPERATIONS LLC, Detroit, MI (US)

(72) Inventors: Yilun Luo, Ann Arbor, MI (US); Khorshed Mohammed Alam, Canton, MI (US); Muhammad A. Zahid, Troy, MI (US); Mazharul Chowdhury, Canton, MI (US); Peng Peng, Columbus, OH (US); Thomas W. Nehl, Shelby Township, MI (US); Junghoon Kim, Springboro, OH (US)

(73) Assignee: GM Global Technology Operations LLC, Detroit, MI (US)

( * ) Notice: Subject to any disclaimer, the term of this patent is extended or adjusted under 35 U.S.C. 154(b) by 219 days.

(21) Appl. No.: 18/483,553

(22) Filed: Oct. 10, 2023

(65) Prior Publication Data
US 2025/0119031 A1    Apr. 10, 2025

(51) Int. Cl.
| | |
|---|---|
| H02K 11/33 | (2016.01) |
| H02K 1/12 | (2006.01) |
| H02K 1/22 | (2006.01) |
| H02K 3/28 | (2006.01) |
| H02K 11/30 | (2016.01) |
| H02K 19/12 | (2006.01) |
| H02P 25/22 | (2006.01) |

(52) U.S. Cl.
CPC ............ *H02K 11/30* (2016.01); *H02K 1/12* (2013.01); *H02K 1/22* (2013.01)

(58) Field of Classification Search
CPC . H02K 11/30; H02K 1/12; H02K 1/22; H02K 19/12; H02K 11/33; H02P 25/20; H02P 9/26; H02P 7/04; H02P 7/298
USPC ............................................ 318/716
See application file for complete search history.

(56) References Cited

U.S. PATENT DOCUMENTS

| | | | | |
|---|---|---|---|---|
| 4,866,364 | A * | 9/1989 | Chiarion | H02K 19/12 318/734 |
| 5,233,251 | A * | 8/1993 | Nehmer | H02K 25/00 310/239 |
| 6,222,331 | B1 * | 4/2001 | Blum | H02K 29/06 318/724 |
| 6,812,663 | B2 * | 11/2004 | Kramer | B60L 50/00 318/368 |
| 8,450,954 | B2 * | 5/2013 | Pietromonaco | H02K 29/06 318/245 |
| 8,742,710 | B2 * | 6/2014 | Yamada | H02P 27/08 318/432 |

(Continued)

FOREIGN PATENT DOCUMENTS

DE   102020105365 A9   10/2021

*Primary Examiner* — Burton S Mullins
(74) *Attorney, Agent, or Firm* — Quinn IP Law (57) ABSTRACT

An electric machine with reconfigurable rotor poles. The machine may include a stator including a plurality of stator windings configured for generating a rotating magnetic field (RMF) and a rotor configured for rotating within the stator according to a torque induced by the RMF. The rotor may include a plurality of rotor windings wrapped around a plurality of circumferentially spaced rotor protrusions. The electric machine may include a rotor power transfer circuit operable for reconfiguring electrical excitation of the rotor windings according to a plurality of excitation modes.

20 Claims, 10 Drawing Sheets

(56) References Cited

U.S. PATENT DOCUMENTS

| | | | |
|---|---|---|---|
| 10,044,307 B2* | 8/2018 | Lundin | H02P 23/10 |
| 10,811,942 B2* | 10/2020 | Liu | H02K 11/33 |
| 10,840,751 B2* | 11/2020 | Baier | H02K 1/24 |
| 12,074,546 B2* | 8/2024 | Pennington, III | H02P 6/08 |
| 12,381,503 B2* | 8/2025 | Orbay | H02P 25/20 |
| 2005/0184689 A1* | 8/2005 | Maslov | H02K 11/33 |
| | | | 318/400.41 |
| 2021/0226488 A1* | 7/2021 | Pennington, III | H02K 21/16 |
| 2021/0249981 A1* | 8/2021 | Ritchey | H02J 7/0014 |
| 2023/0231433 A1* | 7/2023 | Mao | H02K 19/32 |
| | | | 310/268 |
| 2024/0195269 A1* | 6/2024 | Pennington, III | H02K 3/28 |
| 2024/0413724 A1* | 12/2024 | McCutcheon | H02P 21/14 |
| 2025/0211071 A1* | 6/2025 | Nikolic | B60L 1/00 |

\* cited by examiner

ELECTRIC MACHINE WITH RECONFIGURABLE ROTOR POLES

INTRODUCTION

The present disclosure relates to electric machines, such as but not necessarily limited to separately excited machines (SEMs) having reconfigurable rotor poles.

Some electric machines may be configured for utilizing electrical power to perform work by turning a rotor, such as in response to a rotating magnetic field (RMF) provided with a stator. The rotors of such electric machines may include separately excitable rotor windings whereby the rotor windings may be excited to generate their own magnetic fields via corresponding rotor poles. The configuration of the rotor poles has historically been fixed insofar as the electric machines lacking an ability to change or otherwise selectively control a quantity and/or a polarity of the rotor poles while the electric machine is in use.

SUMMARY

One non-limiting aspect of the present disclosure relates to an electric machine having reconfigurable rotor poles whereby a quantity and/or a polarity of the rotor poles may be changed or otherwise selectively controlled while in use. The electric machines may be operable according to a plurality of excitation modes whereby the excitation modes may be selectively employed to implement corresponding changes to the quantity and/or the plurality of the rotor poles depending on operating conditions, such as to optimize performance according to selectable quantities and/or polarities for the rotor poles.

One non-limiting aspect of the present disclosure relates to a separately excited machine (SEM) with reconfigurable rotor poles. The SEM may include a stator including a plurality of stator windings configured for generating a rotating magnetic field (RMF) and a rotor configured for rotating within the stator according to a torque induced by the RMF. The rotor may include a plurality of rotor windings wrapped around a plurality of circumferentially spaced rotor protrusions, with the rotor windings providing a plurality of rotor poles when electrically excited. The SEM may further include a rotor power transfer circuit operable for reconfiguring electrical excitation of the rotor windings according to a plurality of excitation modes.

The excitation modes may include a polarity excitation mode operable for reconfiguring a magnetic polarity of one or more of the rotor poles from a North magnetic polarity to a South polarity.

The excitation modes may include a quantity excitation mode operable for reconfiguring a quantity of the rotor poles from a first quantity to a second quantity.

The quantity excitation mode may reconfigure the rotor poles from an alternating magnetic polarity to a paired magnetic polarity, the paired magnetic polarity resulting in adjoining pairs of the rotor poles having matching magnetic polarities.

The matching magnetic polarity of the adjoining pairs may each respectively combine to form a plurality of equivalent rotor poles such that the first quantity corresponds with the rotor poles having the alternating magnetic polarity and the second quantity corresponds with the rotor poles having the paired magnetic polarity.

The quantity excitation mode may reconfigure the rotor poles from a balanced excitation to an unbalanced excitation, the unbalanced excitation resulting in one or more of the rotor windings being unexcited relative to the balanced excitation.

The balanced excitation may include exciting each of the rotor windings such that the first quantity corresponds with each of the rotor poles being excited and the second quantity corresponds with one or more of the rotor poles being unexcited.

The rotor power transfer circuit may include a controller, a plurality of winding circuits connected to the rotor windings, and a plurality of switches connected between one or more of the winding circuits and a source of direct current (DC) power. The controller may be operable for selectively controlling the switches between opened and closed states to reconfigure the electrical excitation of the rotor windings associated therewith.

The winding circuits may include one or more non-reconfigurable winding circuits and one or more reconfigurable winding circuits, the non-reconfigurable winding circuits connecting directly to the source independently of the switches and the reconfigurable winding circuits connecting to the source via one or more of the switches.

The switches for each of the winding circuits may be arranged according to an H-bridge, the H-bridge configuration including a top-left switch, a top-right switch, a bottom-left switch, and a bottom-right switch.

The winding circuits each may include a first terminal and a second terminal, with the first terminals each connecting between the top-left switch and the bottom-left switch of the H-bridge configuration associated therewith and the second terminals each connecting between the top-right switch and the bottom-right switch of the H-bridge configuration associated therewith.

The source may provide the DC output relative to a positive rail and a negative rail, with the top-left switches and the top-right switches connecting to the positive rail, the bottom-left switches and the bottom-right switches connecting to the negative rail, the top-left switch of each of the H-bridge configurations connecting to the bottom-left switch of the H-bridge configuration corresponding therewith, and the top-right switch of each of the H-bridge configurations connecting to the bottom-right switch of the H-bridge configuration corresponding therewith.

The switches may be included within an external portion of the rotor power transfer circuit external to a shaft of the rotor.

The switches may be included within an internal portion of the rotor power transfer circuit internal to a shaft of the rotor.

The rotor protrusions each may include no more than one of the rotor windings, with the rotor windings each connect to a different one of the winding circuits such that each of the rotor poles correspond with a separate one of the winding circuits.

The rotor power transfer circuit may include an electrical interface for each of the winding circuits, with each electrical interface transferring electrical power between the switches and the winding circuit associated therewith.

The electrical interfaces may be configured to provide mechanical transport of electrical power with brushes and slip rings, inductive transport of electrical power with transformers, and/or capacitive transport of electrical power with capacitors.

One non-limiting aspect of the present disclosure relates to an electric machine with reconfigurable rotor poles. The machine may include a stator including a plurality of stator windings configured for generating a rotating magnetic field (RMF) and a rotor configured for rotating within the stator according to a torque induced by the RMF. The rotor may include a plurality of rotor windings wrapped around a plurality of circumferentially spaced rotor protrusions, with the rotor windings providing a plurality of rotor poles when electrically excited. The machine may include a rotor power transfer circuit including a plurality of winding circuits connected to the rotor windings, a plurality of switches connected between one or more of the winding circuits and a source of direct current (DC) power, and a controller operable for reconfiguring a quantity and/or a polarity of the rotor poles by varying electrical excitation of the rotor windings.

The source may provide the DC output relative to a positive rail and a negative rail, the rotor protrusions each may include no more than one of the rotor windings, the rotor windings each may connect to a different one of the winding circuits, the winding circuits each may include a first terminal and a second terminal, the switches for each of the winding circuits may be arranged according to an H-bridge. The H-bridge configuration may include a top-left switch, a top-right switch, a bottom-left switch, and a bottom-right switch, optionally with the first terminals each connecting between the top-left switch and the bottom-left switch of the H-bridge configuration associated therewith, the second terminals each connecting between the top-right switch and the bottom-right switch of the H-bridge configuration associated therewith, the top-left switches and the top-right switches connecting to the positive rail, the bottom-left switches and the bottom-right switches connecting to the negative rail, the top-left switch of each of the H-bridge configurations connecting to the bottom-left switch of the H-bridge configuration corresponding therewith, and the top-right switch of each of the H-bridge configurations connecting to the bottom-right switch of the H-bridge configuration corresponding therewith. The machine may further include the controller being operable for selectively controlling the switches between opened and closed states to reconfigure the electrical excitation of the rotor windings associated therewith.

One non-limiting aspect of the present disclosure relates to a vehicle. The vehicle may include an electric motor configured for converting electrical power to mechanical power for purposes of propelling the vehicle. The electric motor may include a stator including a plurality of stator windings configured for generating a rotating magnetic field (RMF) and a rotor configured for rotating within the stator according to a torque induced by the RMF. The rotor may include a plurality of rotor windings wrapped around a plurality of circumferentially spaced rotor protrusions, with the rotor windings providing a plurality of rotor poles when electrically excited. The electric motor may further include a rotor power transfer circuit operable for reconfiguring a quantity and/or a polarity of the rotor poles by varying electrical excitation of the rotor windings according to a corresponding one of a plurality of excitation modes.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
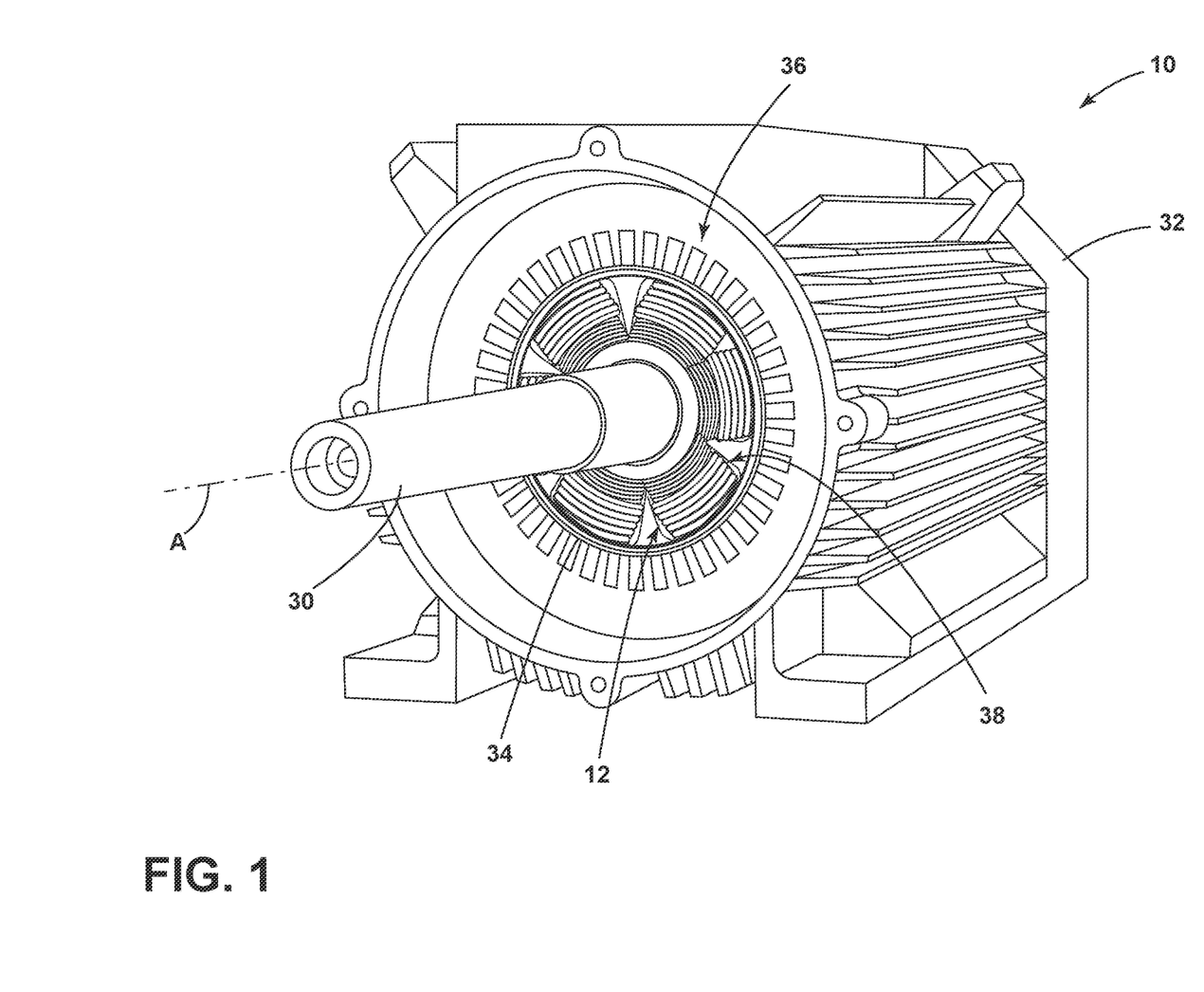
FIG. 1 illustrates a schematic view of a reconfigurable electric machine in accordance with one non-limiting aspect of the present disclosure.
Figure 2:
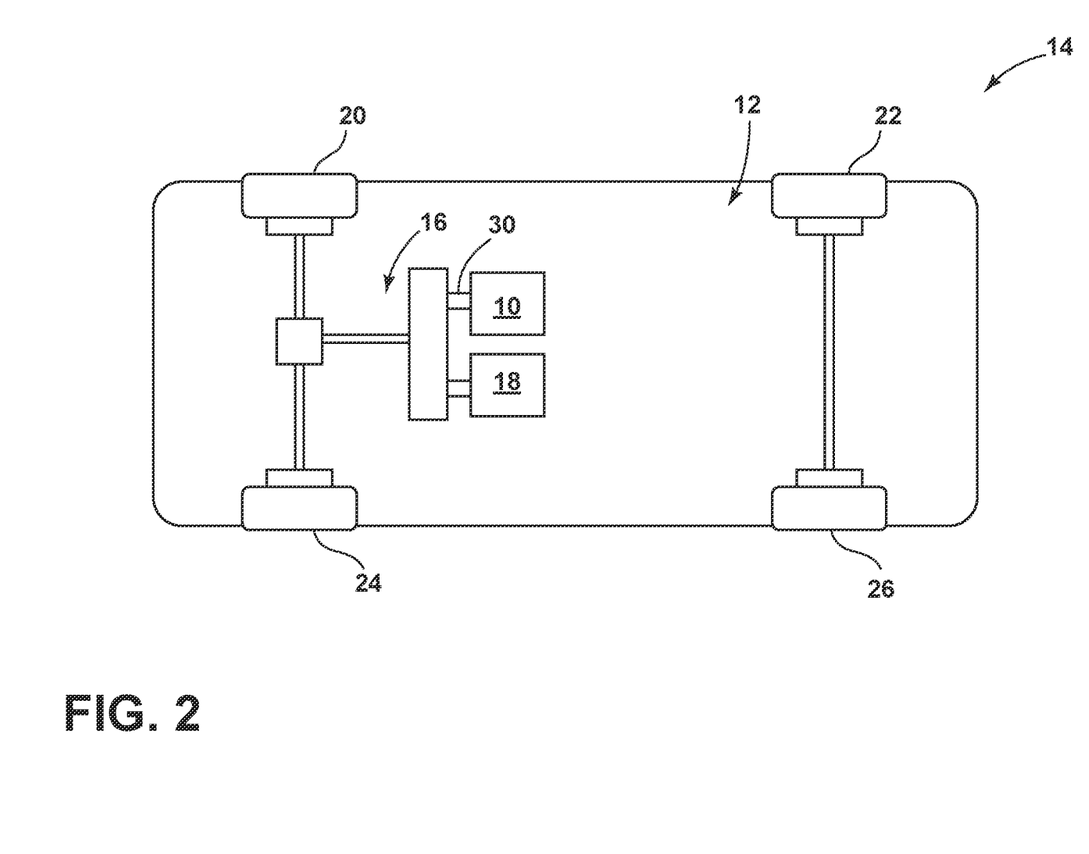
FIG. 2 illustrates a schematic view of a vehicle having the electric machine in accordance with one non-limiting aspect of the present disclosure.

FIG. 1 illustrates a schematic view of a reconfigurable electric machine 10 in accordance with one non-limiting aspect of the present disclosure. The electric machine 10 may be of the type employing a rotor 12 to impart mechanical force to a load in proportion to an electrical excitation thereof and/or to generate electrical energy in response to the rotation thereof. The electric machine 10, at least in the illustrated configuration, may be referred to as an electric motor or a separately excited machine (SEM) 10 operable for propelling a vehicle and/or regenerative braking. FIG. 2 illustrates a schematic view of a vehicle 14 having the electric motor 10 in accordance with one non-limiting aspect of the present disclosure. The electric motor 10 may be employed within the vehicle 14 to facilitate imparting mechanical force to a propulsion system, powertrain, or drivetrain 16 operable for propelling or otherwise driving the vehicle 14. The vehicle 14 is illustrated as a hybrid type due to the powertrain 12 optionally including an internal combustion engine (ICE) 18. The powertrain 16 may include a transmission, a driveshaft, a differential, axles and/or other componentry to facilitate conveying rotative force from a rotor shaft 30 coupled with the rotor 10 (see FIG. 1) to the wheels 20, 22, 24, 26. The vehicle 14 is shown to include the powertrain 12 operable with the front wheels 20, 24 for non-limiting purposes as the present disclosure fully contemplates its use and application with four-wheel drive automobiles and other, non-automobile types of vehicles.

Returning to FIG. 1, the electric motor 10 may include a housing 32 configured to support a rearward end (not shown) of the rotor shaft 30 while permitting the rotor 10 to rotate within an airgap 34 relative to a stator 36. The stator 36 may be disposed annularly around the rotor 10 for purposes of generating a rotating magnetic field (RMF), which as one skilled in the art may appreciate, may be used to impart a rotational torque sufficient for rotating the rotor 10. While not shown in detail, the stator 36 may include stator windings or other features capable of being electrically excited for purposes of controlling the RMF and the resulting rotation of the rotor 10. The rotor 10 may include a plurality of rotor windings 38 wrapped around a plurality of circumferentially spaced rotor protrusions 42, which when excited, may be used to induce a rotor magnetic field within a corresponding plurality of rotor poles 44 (see FIG. 3). The rotor magnetic field may interact with the RMF to facilitate rotating the rotor shaft 30 to propel the vehicle 14 and/or for regenerative braking in response to rotation of the rotor shaft 30. The rotor 10 may be formed with a generally annular shape, optionally from a plurality of laminations stack in a side-by-side facing relationship axially along an access of rotation A. While generically shown in FIG. 1, and as detailed below in more detail below, the present disclosure contemplates the 12 having the rotor protrusions 42 wrapped or otherwise configured with one or more separately excitable rotor windings 38, i.e., wrapping the rotor protrusions 42 with distinct and independently excitable sets of rotor windings 38.

Figure 3:
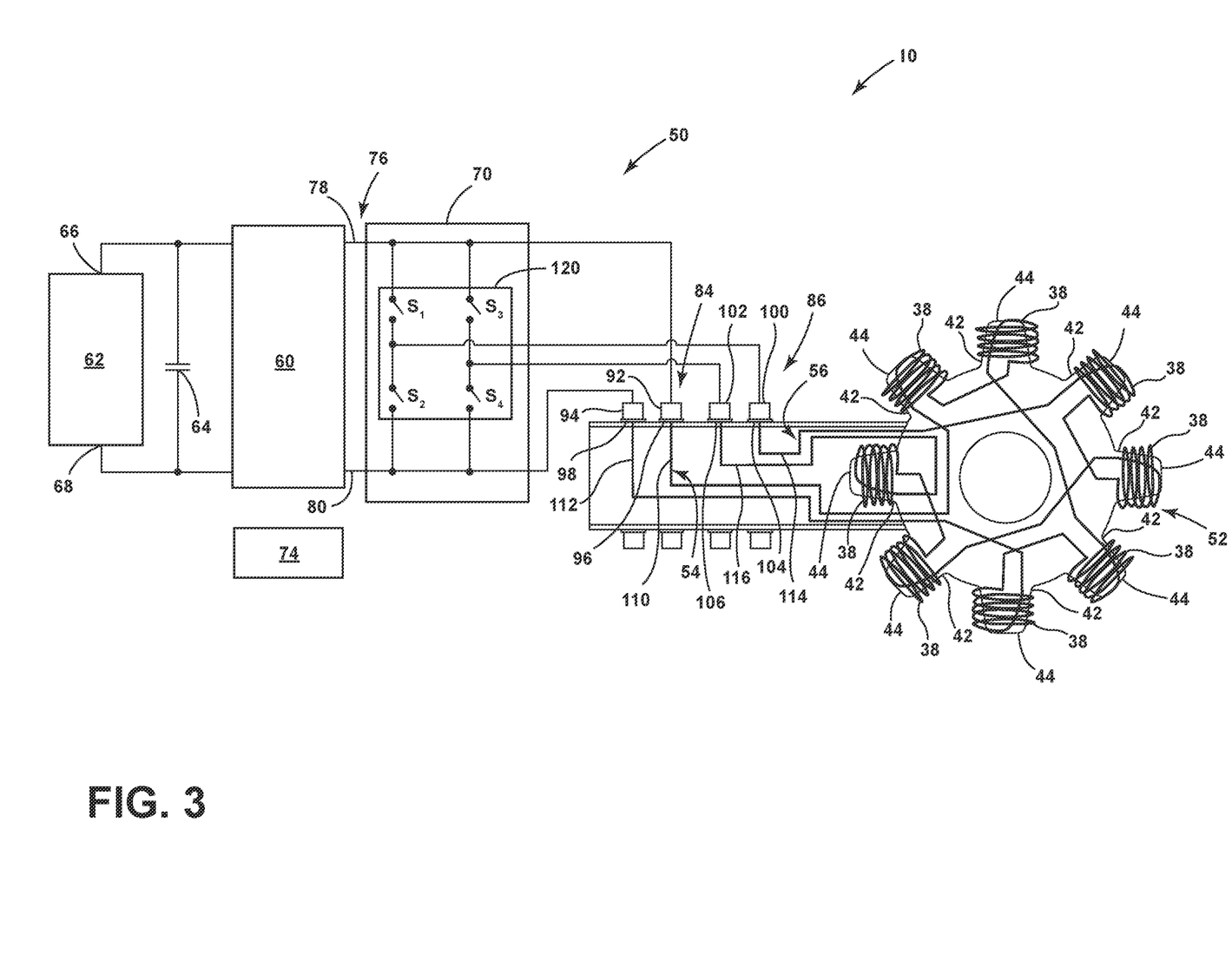
FIG. 3 illustrates a schematic diagram of a transfer circuit in accordance with one non-limiting aspect of the present disclosure.

FIG. 3 is a schematic diagram of the reconfigurable separately excited electric machine rotor in accordance with one non-limiting aspect of the present disclosure. The electric motor may include a rotor transfer circuit 50, which is shown as being operable with a single set of rotor windings 38 wrapped around each protrusion 42, however, the present disclosure fully contemplates the rotor transfer circuit 50 being operable with multiple sets of rotor windings 38. The rotor windings 38 may be electrically connected to one of a plurality of rotor winding circuits 54, 56, which is illustrated configured corresponds with a first portion of the rotor windings 38 being connected to a first winding circuit 54 and a second portion of the rotor windings 38 being connected to a second rotor winding circuit 56. The configuration of the rotor winding circuits 54, 56 and the connection of the rotor windings 38 thereto may be a design parameter that may vary depending on operational considerations of the electric motor 10. Additional rotor winding circuits may be included and/or the rotor winding circuits 54, 56 may be connected to the rotor windings in a different sequence, pattern, and/or the connection points between the rotor windings 38 and the winding circuits 54, 56 may be varied, i.e., the ends of the rotor windings 38 may be switched or reverse relative to the corresponding winding circuit 54, 56 so as to provide a different magnetic polarity.

The rotor transfer circuit 50 may be operable in the manner described herein to facilitate selectively exciting the rotor windings 38 via the corresponding rotor winding circuits 54, 56. The excitation of the rotor windings 38 may produce a corresponding magnetic field relative to the rotor protrusion 42 associated therewith, which in the illustrated configuration may be used to produce an eight-pole configuration, i.e., the rotor winding excitation effectively produces eight rotor poles 44 when each of the rotor windings 38 are excited. This eight-pole configuration is presented for non-limiting purposes as the present disclosure fully contemplates the rotor transfer circuit being operable with or included as part of electric machines having more or less rotor protrusions 42, e.g., to support six-pole, 12-pole, etc. configurations. The rotor transfer circuit 50 may be in the manner described hiring for having reconfiguring one or more of the rotor poles 44 such that a quantity and/or a polarity of the rotor poles 44 may be changed or otherwise selectively controlled while in use. The quantity, the polarity, and/or other characteristics of the rotor poles 44 may be correspondingly reconfigurable according to a plurality of excitation modes. The excitation modes may be selectively employed to reconfigure the rotor poles 44 depending on operating conditions, such as to optimize performance according to selectable quantities and/or polarities for the rotor poles 44.

The rotor transfer circuit 50 may include a DC-to-DC (DC-DC) converter 60 operable for controlling DC power transfer with a source 62 of DC power. The source 62 may optionally correspond with a rechargeable energy storage system (RESS) operable for storing and supplying DC power, optionally with a DC link capacitor 64 being connected across a positive terminal 66 and a negative terminal 68 of the source 62 to facilitate filtering and smoothing the DC power. The rotor transfer circuit 50 may include a switching circuit 70 having a plurality of switches S1, S2, S3, S4 operable between an opened or off state and a closed or on state. The switches S1, S2, S3, S4 may be semiconductor switches, transistors, etc. capable of being selectively controlled between opened and closed states. The switches S1, S2, S3, S4 are shown to be external to the rotor shaft 30, i.e., within an external portion of the rotor transfer circuit 50. The present disclosure, however, contemplates integrating the switches S1, S2, S3, S4 within an internal portion of the rotor transfer circuit 50, such as within the rotor shaft 30. The rotor transfer circuit 50 may include a controller 74 configured for selectively controlling the switches S1, S2, S3, S4 between states. The controller 74 may include a plurality of non-transitory instructions stored on a computer-readable storage medium, which when executed with one or more processors, may be operable for facilitating the operations, processes, and other activities contemplated herein. The controller 74 may be configured to facilitate reconfiguring the rotor poles 44 by selectively controlling excitation of the rotor windings 38 associated therewith according to one or more of a plurality of excitation modes.

The excitation of the rotor windings 38 may be based on electrical power transfer through the switching circuit 70, such as between a DC output 76 provided from the DC-DC converter relative to a positive rail 78 and a negative rail 80. The rotor transfer circuit 50 may include electrical interfaces 84, 86 configured for electrically connecting the switching circuit 70 with the winding circuits 54, 56. The electrical interfaces 84, 86 are shown as a brush-slip configuration whereby brushes and slips 92, 94, 96, 98, 100, 102, 104, 106 may be used for commuting electrical power between the switching circuit 70 and the winding circuits 54, 56. The electrical interface 84, for example, may include brushes 92, 94 operable for exchanging electrical power with slip rings 96, 98 connected to the first winding circuit 54 and brushes 100, 102 operable for exchanging electrical power with slip rings 104, 106 connected to the second winding circuit 56. The positive and negative brushes 92, 94, 100, 102 may be correspondingly positioned to physically contact the slip rings 96, 98, 104, 106 attached to the rotor shaft 30, with the physical contact being operable for facilitating electrically power exchange therebetween while the rotor 12 is stationary and rotating. The present disclosure fully contemplates the electrical interface 94 having other configurations suitable for providing electrical energy to and/or to receive electrical energy from the rotor windings 38, such as via capacitive and/or inductive type of couplings whereby physical contact between the switching circuit 70 and the rotor winding circuit 54 may be unnecessary.

The switching circuit 70 is shown with the first winding circuit 54 having a non-reconfigurable configuration and the second winding circuit 56 having a reconfigurable configuration such that the first winding circuit 54 may be correspondingly characterized as a non-reconfigurable winding circuit and the second winding circuit 56 may be considered as a reconfigurable winding circuit. The first winding circuit 54 may be considered as non-reconfigurable due to a first terminal 110 and a second terminal 112 thereof being fixedly or permanently connected to a respective one of the positive and negative rails 78, 80. The second winding circuit 56 may be considered as reconfigurable due to a first terminal 114 and a second terminal 116 thereof being selectively connectable to respective ones of the positive and negative rails 78, 80 depending on whether the intervening switches S1, S2, S3, S4 are controlled to the opened and/or closed states. The switches S1, S2, S3, S4 may be arranged in the illustrated manner according to an H-bridge configuration 120. The H-bridge configuration 120 may be characterized by the switches S1, S2, S3, S4 being arranged to include a top-left switch S1, a top-right switch S3, a bottom-left switch S2, and a bottom-right switch S4. With respect to the second circuit 56, the first terminal 114 may connect between the top-left switch S1 and the bottom-left switch S2 and the second terminal 116 may connect between the top-right switch S3 and the bottom-right switch S4. The top-left switch S1 and the top-right switch S3 may connect to the positive rail 78, the bottom-left switch S2 and the bottom-right switch S4 may connect to the negative rail 80, the top-left switch S1 may connect to the bottom-left switch S2, and the top-right switch S3 may connect to the bottom-right switch S4.

Figure 4:
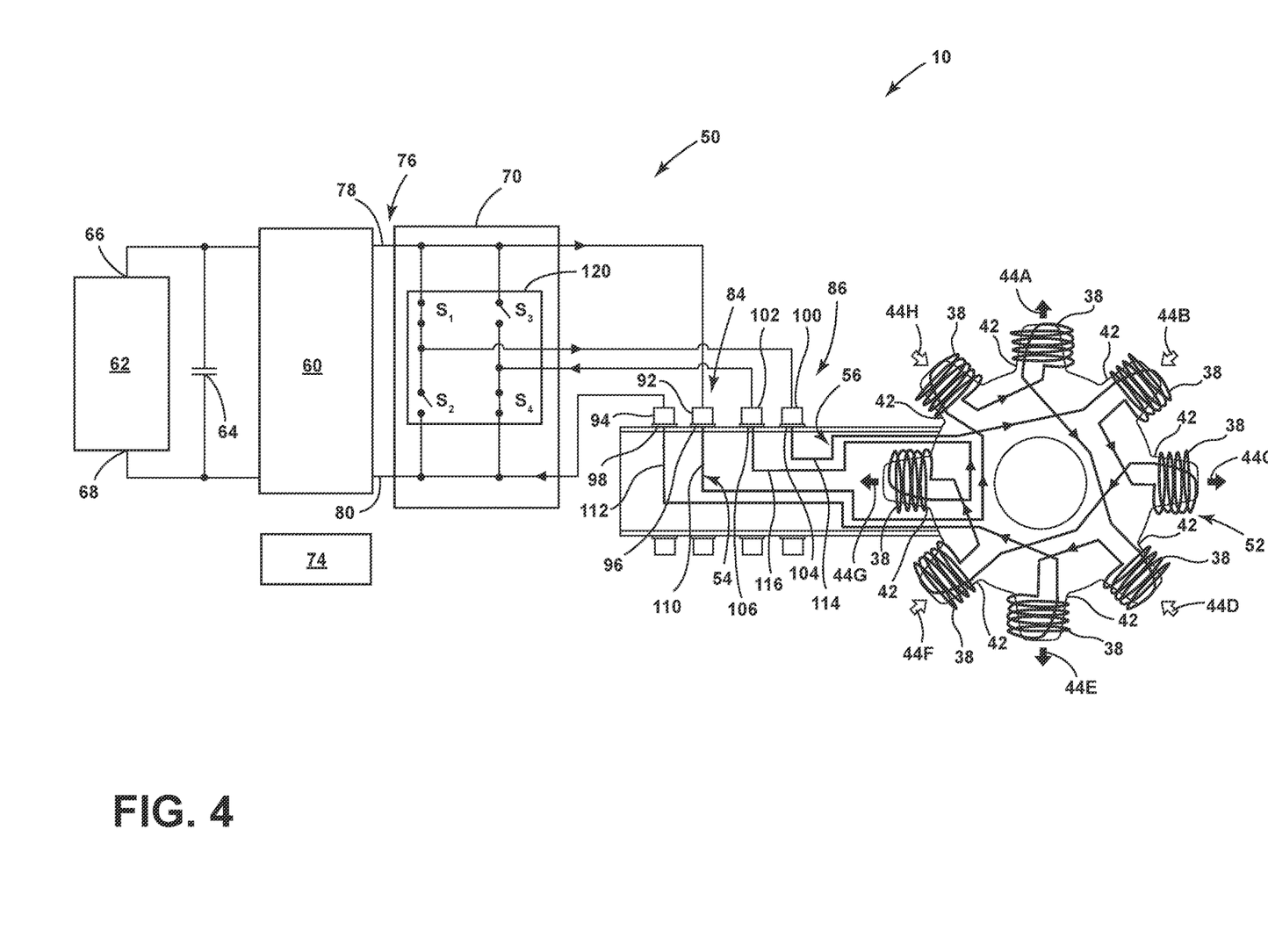
FIG. 4 illustrates an alternating polarity excitation mode in accordance with one non-limiting aspect of the present disclosure.

FIG. 4 illustrates an alternating polarity excitation mode in accordance with one non-limiting aspect of the present disclosure. The alternating plurality excitation mode may correspond with the controller 74 controlling the DC-DC converter 60 to provide DC power and to control H-bridge configuration 120 such that the top-left and bottom-right switches S1, S4 are in the closed state and the bottom-left and top-right switches S2, S3 are in the opened state. With the first winding circuit 54 being tied to the positive and negative rails 78, 80, the alternating plurality excitation may result in the first terminal 114 of the second circuit winding 56 connecting to the positive rail 78 and the second terminal 116 thereof connecting to the negative rail 80, which in turn result in a first rotor pole 44A having a first or North polarity, a second rotor pole 44B having a second or South polarity, a third rotor pole 44C having a North polarity, a fourth rotor pole 44D having South polarity, a fifth rotor pole 44E having a North polarity, a six rotor pole 44F having a South polarity, and an eighth rotor pole 44G having a North polarity, with the corresponding current flow is shown with arrows.

Figure 5:
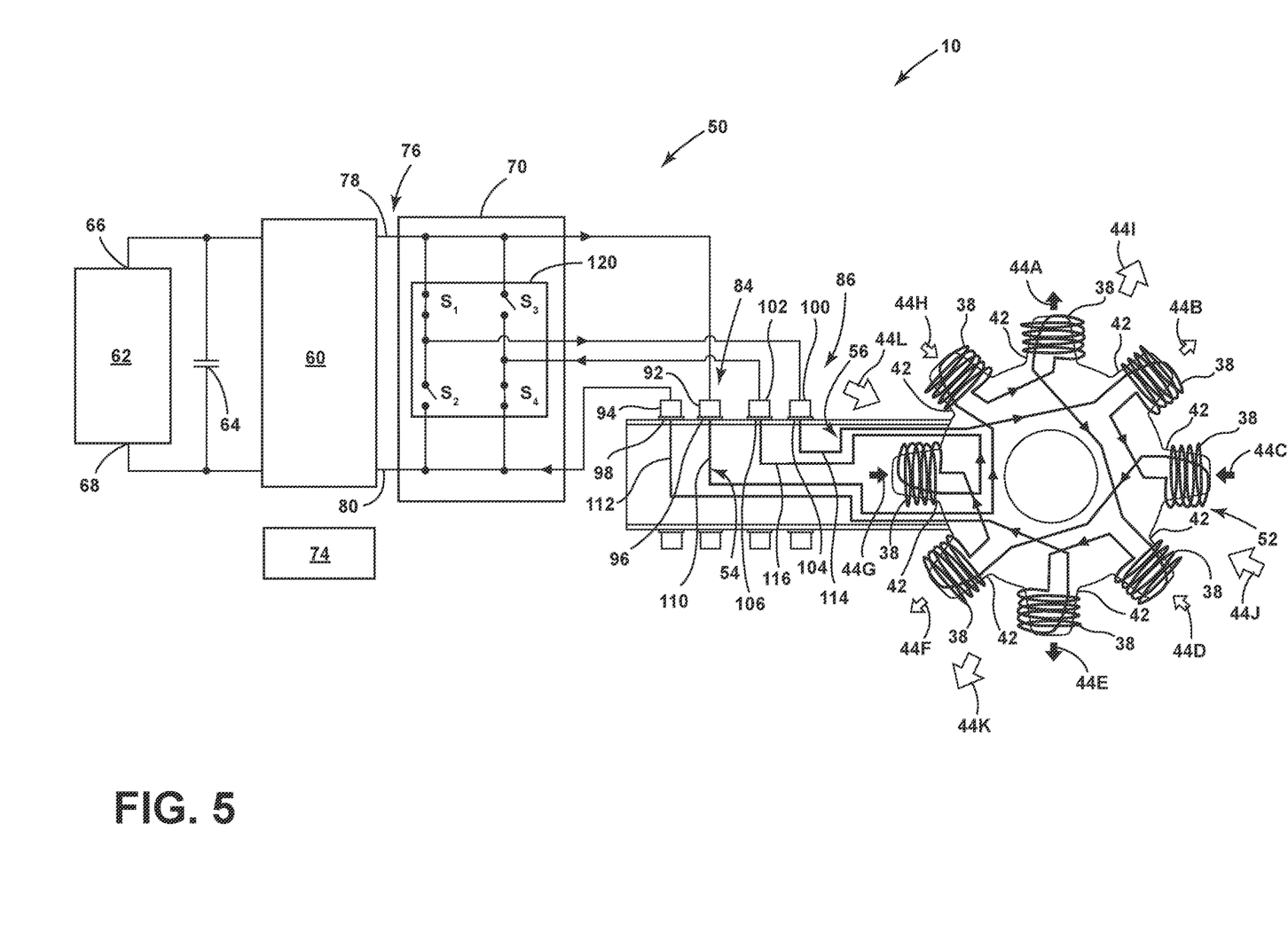
FIG. 5 illustrates an excitation mode with paired magnetic polarity in accordance with one non-limiting aspect of the present disclosure.

FIG. 5 illustrates a quantity excitation mode with paired magnetic polarity in accordance with one non-limiting aspect of the present disclosure. The excitation mode may correspond with the controller 74 controlling the DC-DC converter 60 to provide DC power and to control the H-bridge configuration 120 such that the top-left and bottom-right switches S1, S4 are in the opened state and the bottom-left and top-right switches S2, S3 are in the closed state. With the first winding circuit 54 being tied to the positive and negative rails 78, 80, the excitation may result in the first terminal 114 of the second circuit winding 56 connecting to the negative rail 80 and the second terminal 116 thereof connecting to the positive rail 78, which in turn result in the first rotor pole 44A having a North polarity, the second rotor pole 44B having a North polarity, the third rotor pole 44C having a South polarity, the fourth rotor pole 44D having South polarity, the fifth rotor pole 44E having a North polarity, the six rotor pole 44F having a North polarity, the seventh rotor pole 44G having a South polarity, and the eighth rotor pole 44H having a South polarity, with the corresponding current flow is shown with arrows. This implementation may be utilized to reconfigure the rotor poles 44A, 44B, 44C, 44D, 44E, 44F, 44G, 44H from the alternating magnetic polarity shown in FIG. 4 to a paired magnetic polarity whereby adjoining pairs of the rotor poles 44A, 44B, 44C, 44D, 44E, 44F, 44G, 44H have matching magnetic polarities. The matching magnetic polarity of the adjoining pairs may result in the pairs combining to form equivalent rotor poles 44I, 44J, 44K, 44L such that relative to FIG. 4 the rotor poles 44 may be reconfigurable from a first quantity to a second quantity, i.e., from an eight-pole configuration to a four-pole configuration.

Figure 6:
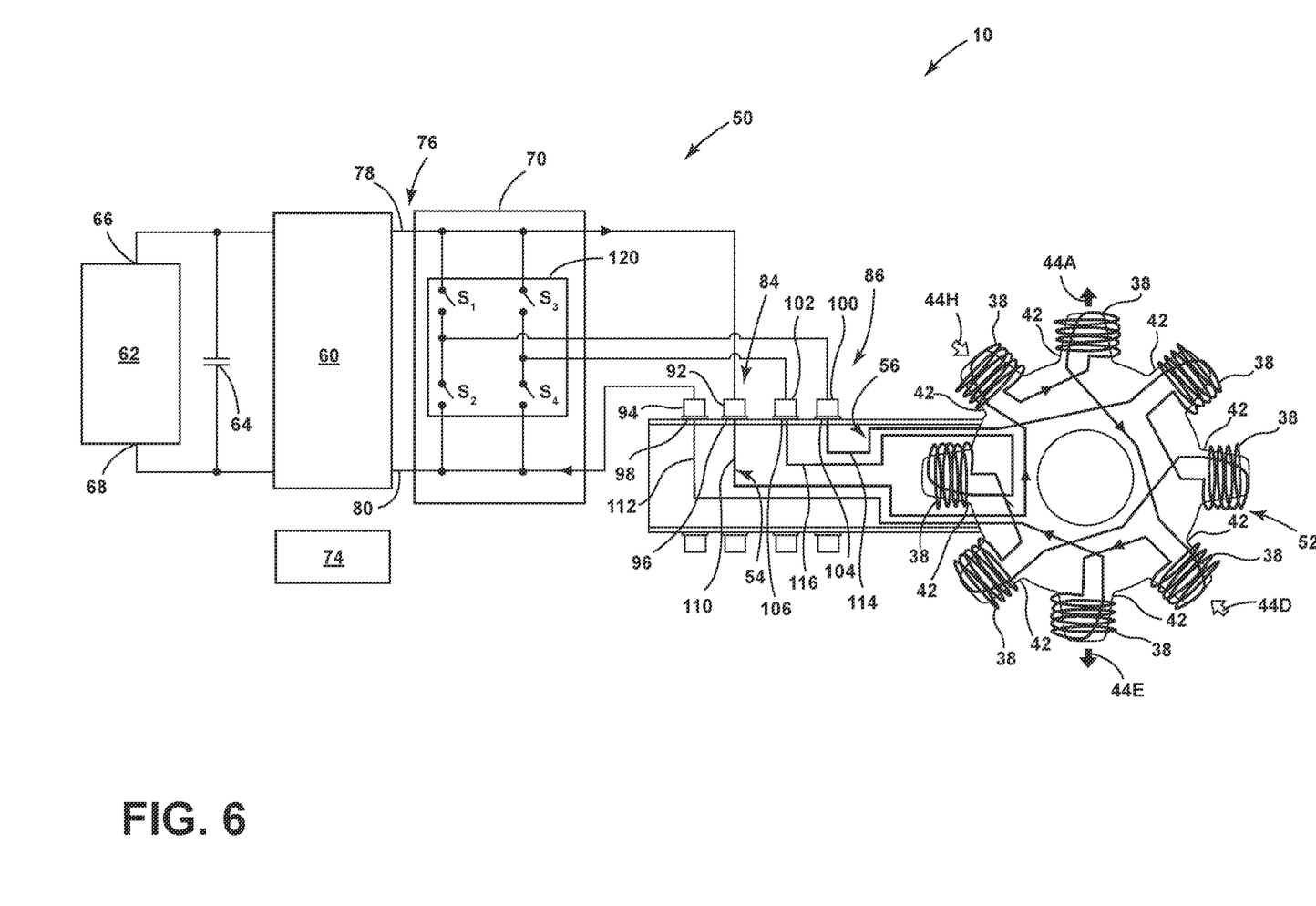
FIG. 6 illustrates an excitation mode with unbalanced excitation in accordance with one non-limiting aspect of the present disclosure.

FIG. 6 illustrates a quantity excitation mode with unbalanced excitation in accordance with one non-limiting aspect of the present disclosure. The excitation mode may correspond with the controller 74 controlling the DC-DC converter 60 to provide DC power and to control the H-bridge configuration 120 such that the top-left, bottom-right, bottom-left, and top-right switches S1, S2, S3, S4 are in the opened state. With the first winding circuit 54 being tied to the positive and negative rails 78, 80, the excitation may result in the first and second terminals 114, 116 of the second circuit winding 56 being unpowered or disconnected, which in turn result in the first rotor pole 44A having a North polarity, the second rotor pole 44B being unpowered, the third rotor pole 44C being unpowered, the fourth rotor pole 44D having South polarity, the fifth rotor pole 44E having a North polarity, the six rotor pole 44F being unpowered, the seventh rotor pole 44G being unpowered, and the eighth rotor pole 44H having a South polarity, with the corresponding current flow is shown with arrows. This implementation may be utilized to reconfigure the rotor poles 44 from the alternating magnetic or balanced polarity shown in FIG. 4 where each of the rotor poles 44 is excited to an unbalanced excitation whereby one or more of the rotor poles 44 are unexcited. The unexcited poles 44B, 44C, 44F, 44G may result in the rotor poles 44 being reconfigurable from a first quantity to a second quantity, i.e., from an eight-pole configuration to a four-pole configuration. By not activating some of the rotor windings 38 in this manner, lower resistance and inductance may be achieved in the rotor system to in turn improve efficiency, with unexcited or inactive rotor poles 44B, 44C, 44F, 44G optionally not completely vestigial as they may still contribute with reluctance.

Figure 7:
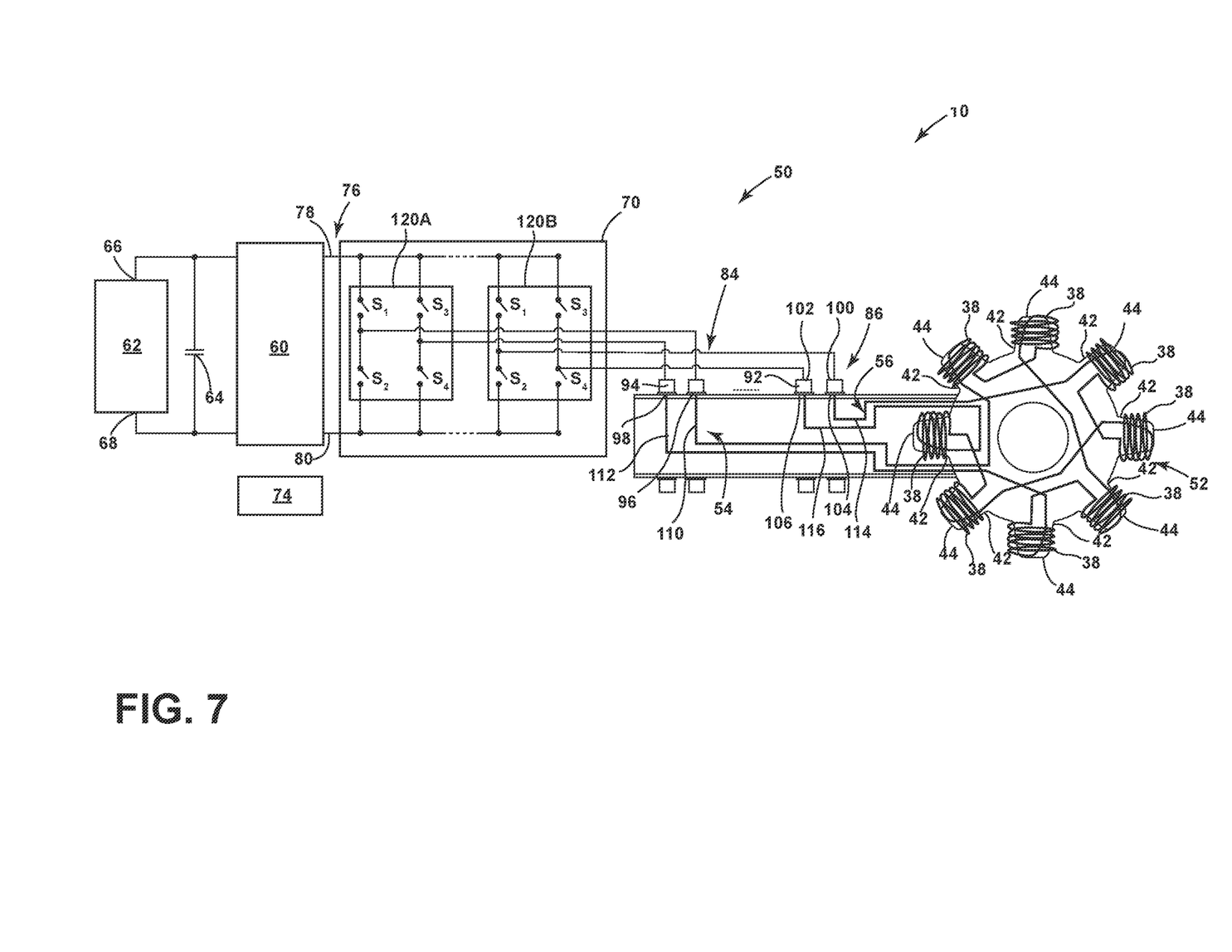
FIG. 7 illustrates a schematic diagram of another transfer circuit in accordance with one non-the aspect of the present disclosure.

FIG. 7 illustrates a schematic diagram of the reconfigurable motor 10 in accordance with one non-the aspect of the present disclosure. Unlike in FIG. 3, the rotor transfer circuit 50 may be configured such that the switching circuit 70 includes multiple H-bridge configurations 120, which are shown to include one H-bridge 120A, 120B for each of the winding circuits 54, 56. For the sake of presentation simplicity, the first and second winding circuits 54, 56 are shown, however, additional winding circuits 54, 56 would be included for each of the rotor poles 44. In other words, the electric motor may include eight winding circuits, with each winding circuit separately and independently connected to one of the rotor windings 38, and the switches 1, S2, S3, S4, Sn−1, Sn−2, Sn−3, Sn−4 of the switching circuit 70 arranged to provide eight H-bridge configuration 120 therefor. Also, unlike FIG. 3 where one of the winding circuits 54, 56 may be permanently tied to the positive and negative rails 78, 80, none of the winding circuits 54, 56 are so tied. The current and direction of each winding circuit 54, 56 may be controlled individually for each rotor winding 38 depending on how the switches S1, S2, S3, S4, Sn−1, Sn−2, Sn−3, Sn−4 of the corresponding H-bridge configuration 120A, 120B may be controlled by the controller 74. The controller 74, as such, may separately control the switches 1, S2, S3, S4, Sn−1, Sn−2, Sn−3, Sn−4 to individually excite or unexcited the rotor poles 44, to individually switch polarity of each rotor poles 44, to control multiple rotor poles 44 to provide equivalent poles, to provide balance and unbalanced configurations, etc. The separate winding circuits 54, 56 and H-bridge configurations 120A, 120B for each of the rotor poles 44 may be beneficial in maximizing reconfigurability of the electric motor 10. The present disclosure, however, fully contemplates other relationships, such as some of the winding circuits 54, 56 connecting to more or less rotor windings 38 than other ones of the winding circuits 54, 56, optionally with each such winding circuit 54, 56 including a dedicated H-bridge configuration 120A, 120B for managing current therethrough.

Figure 8:
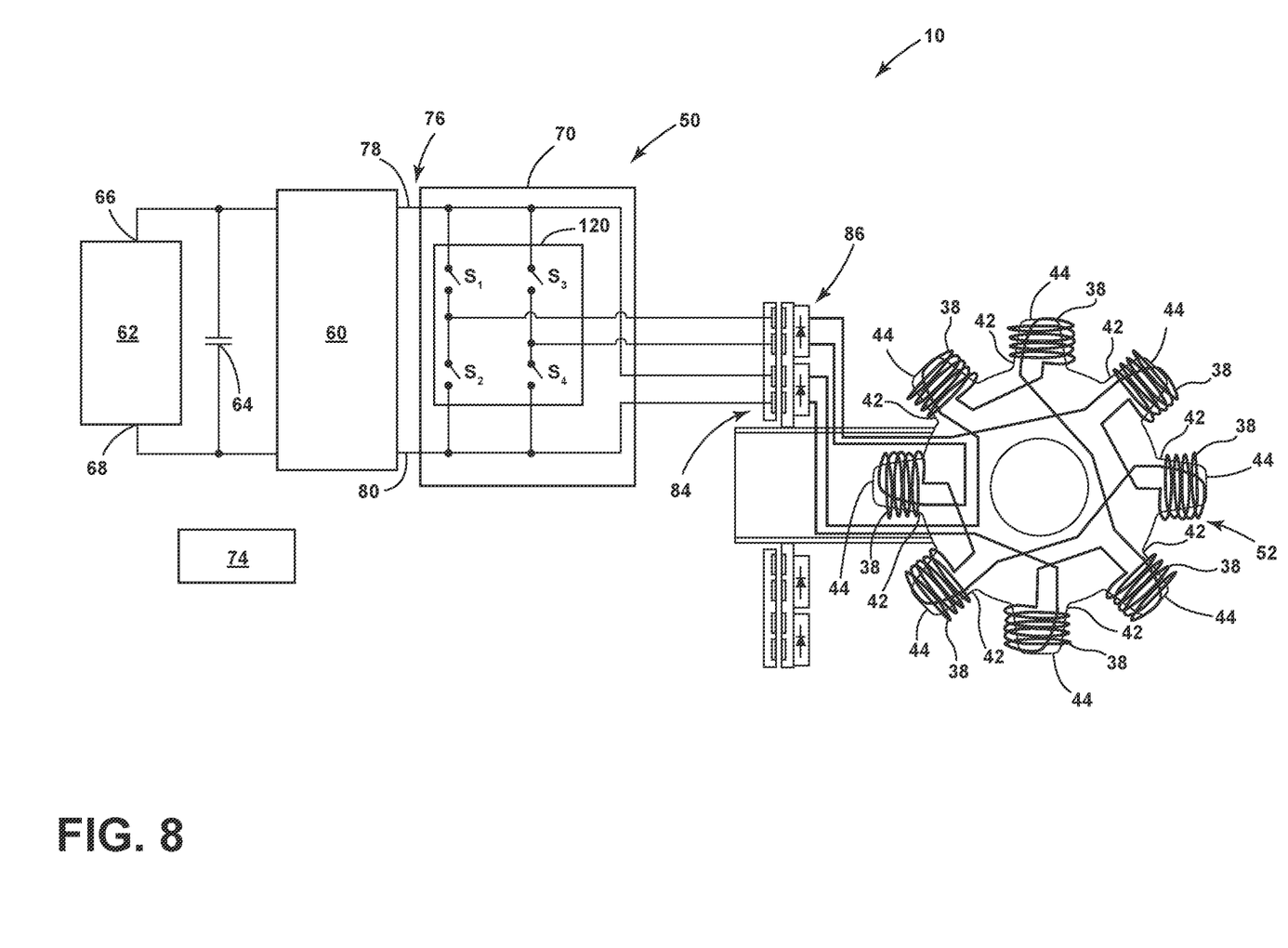
FIG. 8 illustrates a schematic view of the reconfigurable motor having capacitive interfaces in accordance with one non-limiting aspect of the present disclosure.
Figure 9:
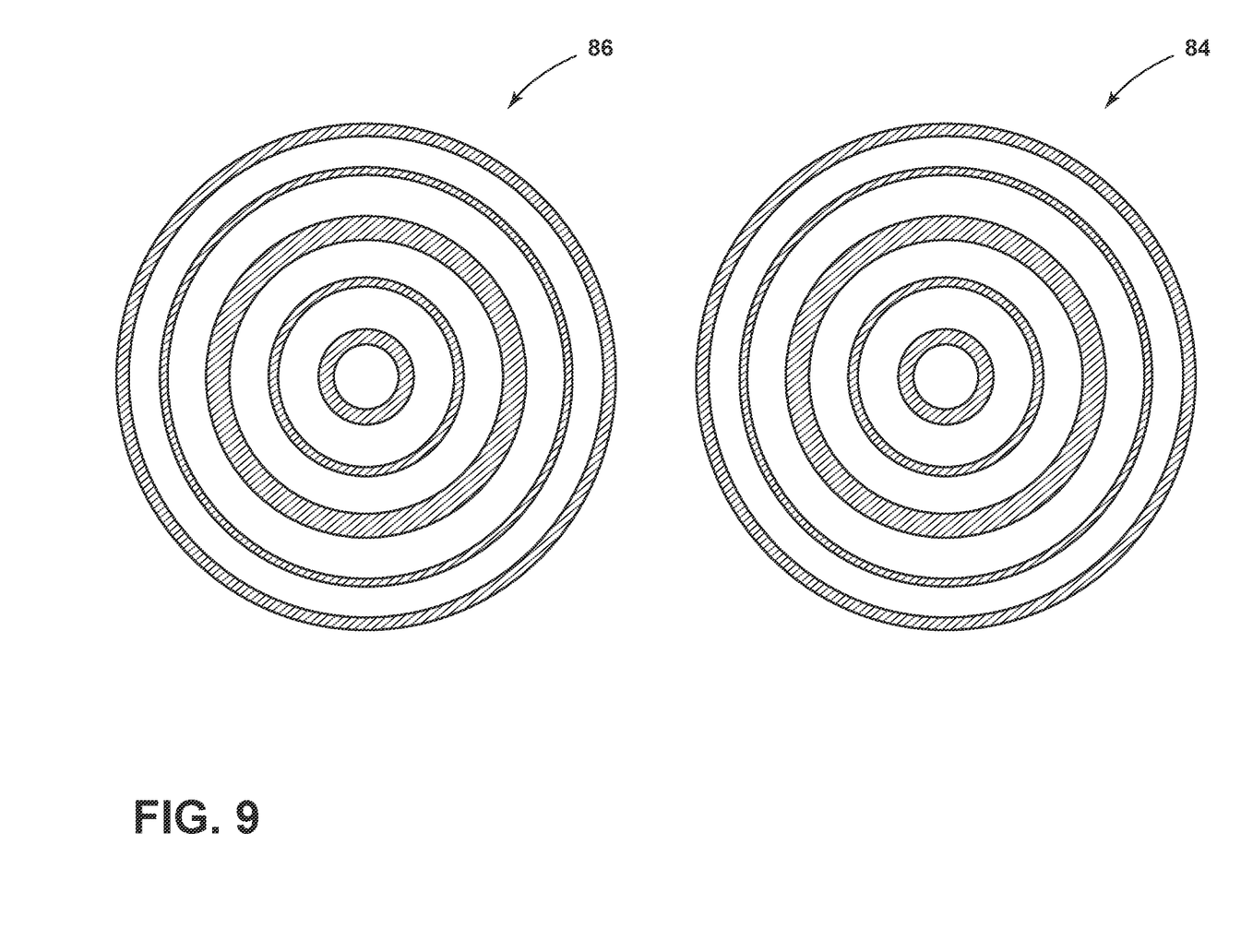
FIG. 9 illustrates a schematic view of the capacitive interfaces in more in accordance with one non-limiting aspect of the present disclosure.
Figure 10:
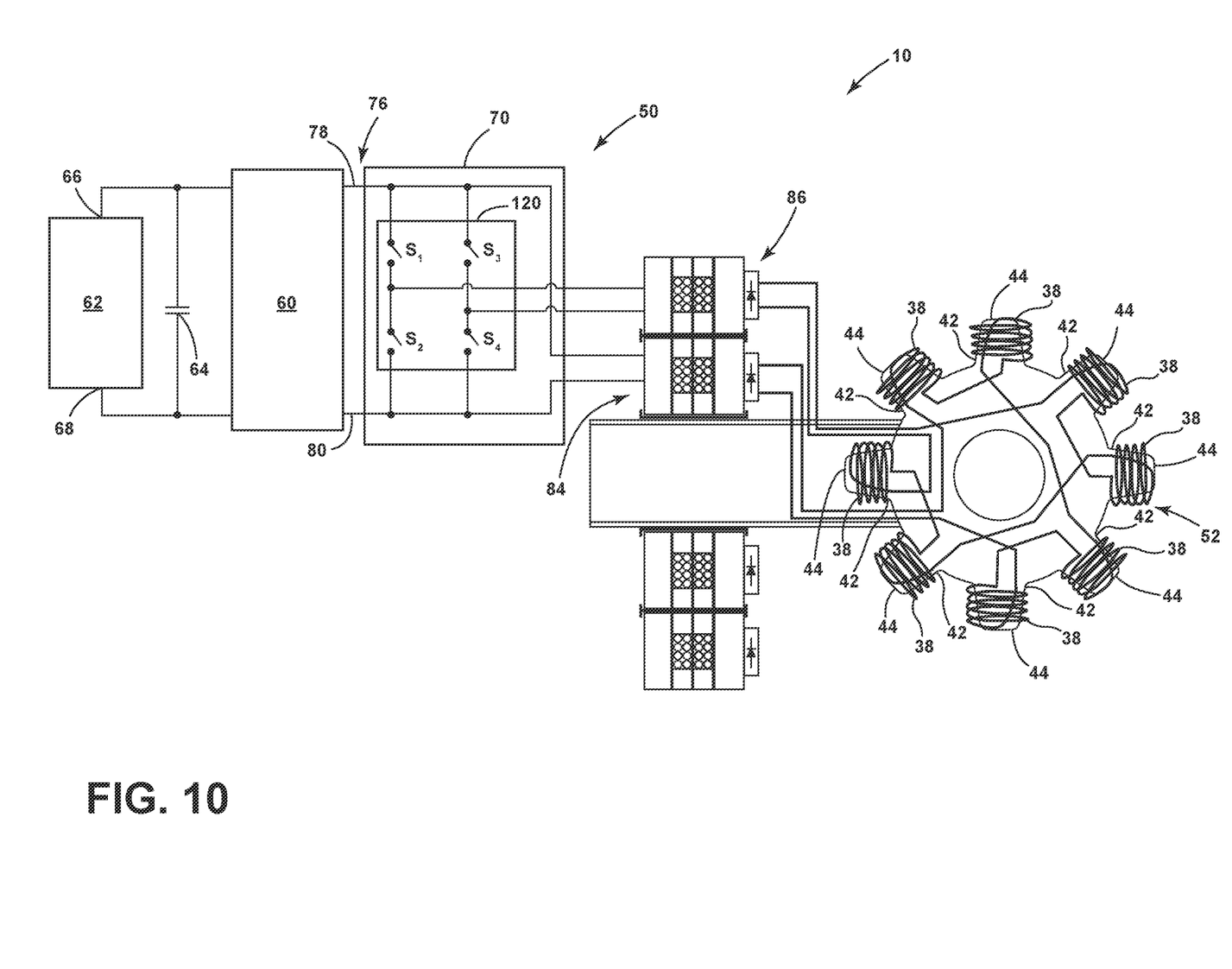
FIG. 10 illustrates a schematic view of the reconfigurable motor having inductive interfaces in accordance with one non-limiting aspect of the present disclosure.

FIG. 8 illustrates a schematic view of the reconfigurable motor 10 having the electrical interfaces 84, 86 configured as capacitive interfaces in accordance with one non-thing aspect of the present disclosure. FIG. 9 illustrates a schematic view of the electrical interfaces 84, 86 in more detail. As shown, the capacitive interfaces 84, 86 may include alternating, concentric layers of insulated retaining material and rotor fields to provide a wireless form of power transfer using diodes (see FIG. 8) on the rotor frame to convert AC to DC current in a wireless power transfer case (rectifier). With capacitive plates acting in the radial direction multiple rings can be placed on the same plane to allow multiple coupling paths to allow for multiple pole configurations for an SEM. The ring carrier may be made using PCB and copper traces, for higher-speed applications a more robust material and aluminum can be used. For higher power transfer, the plates may be stacked in the radial direction or the diameter or the ring carrier needs to be increased to allow for more surface area. Each path may need its own set of DC/AC/DC converters. FIG. 10 illustrates a schematic view of the reconfigurable motor 10 having the electrical interfaces 84, 86 configured as inductor based interfaces in accordance with one non-limiting aspect of the present disclosure. By using two sets of stacked rotary transformers, two separate excitation signals can be sent to the two independent rotor winding sets which can be driven with the two different pole configurations. Each pair of rotary transformers may need to be magnetically insulated from one another as both secondary rotating windings are to be excited with two independent flux paths. The inductive power transfer for pole configuration is not limited to the axial orientation, but can be also utilized in the radial direction for shaft embedded power transfer.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A separately excited machine (SEM) with reconfigurable rotor poles, comprising:
a stator including a plurality of stator windings configured for generating a rotating magnetic field (RMF);
a rotor configured for rotating within the stator according to a torque induced by the RMF, the rotor including a plurality of rotor windings wrapped around a plurality of circumferentially spaced rotor protrusions, the rotor windings providing a plurality of rotor poles when electrically excited; and
a rotor power transfer circuit operable for reconfiguring electrical excitation of the rotor windings according to a plurality of excitation modes, wherein the rotor power transfer circuit includes a plurality of winding circuits connected to the rotor windings, and wherein the winding circuits include one or more non-reconfigurable winding circuits and one or more reconfigurable winding circuits.

2. The SEM according to claim 1, wherein:
the excitation modes include a polarity excitation mode operable for reconfiguring a magnetic polarity of one or more of the rotor poles from a North magnetic polarity to a South polarity.

3. The SEM according to claim 1, wherein:
the excitation modes include a quantity excitation mode operable for reconfiguring a quantity of the rotor poles from a first quantity to a second quantity.

4. The SEM according to claim 3, wherein:
the quantity excitation mode reconfigures the rotor poles from an alternating magnetic polarity to a paired magnetic polarity, the paired magnetic polarity resulting in adjoining pairs of the rotor poles having matching magnetic polarities.

5. The SEM according to claim 4, wherein:
the matching magnetic polarity of the adjoining pairs each respectively combine to form a plurality of equivalent rotor poles such that the first quantity corresponds with the rotor poles having the alternating magnetic polarity and the second quantity corresponds with the rotor poles having the paired magnetic polarity.

6. The SEM according to claim 3, wherein:
the quantity excitation mode reconfigures the rotor poles from a balanced excitation to an unbalanced excitation, the unbalanced excitation resulting in one or more of the rotor windings being unexcited relative to the balanced excitation.

7. The SEM according to claim 6, wherein:
the balanced excitation includes exciting each of the rotor windings such that the first quantity corresponds with each of the rotor poles being excited and the second quantity corresponds with one or more of the rotor poles being unexcited.

8. The SEM according to claim 1, wherein:
the rotor power transfer circuit additionally includes a controller and a plurality of switches connected between one or more of the winding circuits and a source of direct current (DC) power, and wherein the controller is operable for selectively controlling the switches between opened and closed states to reconfigure the electrical excitation of the rotor windings associated therewith.

9. The SEM according to claim 8, wherein:
the non-reconfigurable winding circuits connecting directly to the source independently of the switches and the reconfigurable winding circuits connecting to the source via one or more of the switches.

10. The SEM according to claim 8, wherein:
the switches for each of the winding circuits are arranged according to an H-bridge, the H-bridge configuration including a top-left switch, a top-right switch, a bottom-left switch, and a bottom-right switch.

11. The SEM according to claim 10, wherein:
the winding circuits each include a first terminal and a second terminal; and
the first terminals each connect between the top-left switch and the bottom-left switch of the H-bridge configuration associated therewith; and
the second terminals each connect between the top-right switch and the bottom-right switch of the H-bridge configuration associated therewith.

12. The SEM according to claim 11, wherein:
the source provides the DC output relative to a positive rail and a negative rail;
the top-left switches and the top-right switches connect to the positive rail;
the bottom-left switches and the bottom-right switches connect to the negative rail;
the top-left switch of each of the H-bridge configurations connects to the bottom-left switch of the H-bridge configuration corresponding therewith; and
the top-right switch of each of the H-bridge configurations connects to the bottom-right switch of the H-bridge configuration corresponding therewith.

13. The SEM according to claim 12, wherein:
the switches are included within an external portion of the rotor power transfer circuit external to a shaft of the rotor.

14. The SEM according to claim 12, wherein:
the switches are included within an internal portion of the rotor power transfer circuit internal to a shaft of the rotor.

15. The SEM according to claim 12, wherein:
the rotor protrusions each include no more than one of the rotor windings; and
the rotor windings each connect to a different one of the winding circuits such that each of the rotor poles correspond with a separate one of the winding circuits.

16. The SEM according to claim 12, wherein:
the rotor power transfer circuit includes an electrical interface for each of the winding circuits, each electrical interface transferring electrical power between the switches and the winding circuit associated therewith.

17. The SEM according to claim 16, wherein:
wherein the electrical interfaces are configured to provide mechanical transport of electrical power with brushes and slip rings; inductive transport of electrical power with transformers; and/or capacitive transport of electrical power with capacitors.

18. An electric machine with reconfigurable rotor poles, comprising:
a stator including a plurality of stator windings configured for generating a rotating magnetic field (RMF);
a rotor configured for rotating within the stator according to a torque induced by the RMF, the rotor including a plurality of rotor windings wrapped around a plurality of circumferentially spaced rotor protrusions, the rotor windings providing a plurality of rotor poles when electrically excited; and
a rotor power transfer circuit including:
a plurality of winding circuits connected to the rotor windings, wherein the winding circuits include one or more non-reconfigurable winding circuits and one or more reconfigurable winding circuits;
a plurality of switches connected between one or more of the winding circuits and a source of direct current (DC) power; and
a controller operable for reconfiguring a quantity and/or a polarity of the rotor poles by varying electrical excitation of the rotor windings.

19. The electric machine according to claim 18, wherein:
the source provides the DC output relative to a positive rail and a negative rail;
the rotor protrusions each include no more than one of the rotor windings;
the rotor windings each connect to a different one of the winding circuits;
the winding circuits each include a first terminal and a second terminal;

the switches for each of the winding circuits are arranged according to an H-bridge, the H-bridge configuration including a top-left switch, a top-right switch, a bottom-left switch, and a bottom-right switch, wherein:

the first terminals each connect between the top-left switch and the bottom-left switch of the H-bridge configuration associated therewith;

the second terminals each connect between the top-right switch and the bottom-right switch of the H-bridge configuration associated therewith;

the top-left switches and the top-right switches connect to the positive rail;

the bottom-left switches and the bottom-right switches connect to the negative rail;

the top-left switch of each of the H-bridge configurations connects to the bottom-left switch of the H-bridge configuration corresponding therewith; and the top-right switch of each of the H-bridge configurations connects to the bottom-right switch of the H-bridge configuration corresponding therewith; and the controller is operable for selectively controlling the switches between opened and closed states to reconfigure the electrical excitation of the rotor windings associated therewith.

20. A vehicle, comprising:

an electric motor configured for converting electrical power to mechanical power for purposes of propelling the vehicle; and wherein the electric motor includes:

a stator including a plurality of stator windings configured for generating a rotating magnetic field (RMF);

a rotor configured for rotating within the stator according to a torque induced by the RMF, the rotor including a plurality of rotor windings wrapped around a plurality of circumferentially spaced rotor protrusions, the rotor windings providing a plurality of rotor poles when electrically excited; and a rotor power transfer circuit operable for reconfiguring a quantity and/or a polarity of the rotor poles by varying electrical excitation of the rotor windings according to a corresponding one of a plurality of excitation modes, wherein the rotor power transfer circuit includes a plurality of winding circuits connected to the rotor windings, and wherein the winding circuits include one or more non-reconfigurable winding circuits and one or more reconfigurable winding circuits.

* * * * *